Jan. 15, 1963  S. ALTER  3,073,564
DAMPER REGULATOR
Filed Feb. 18, 1960  2 Sheets-Sheet 1
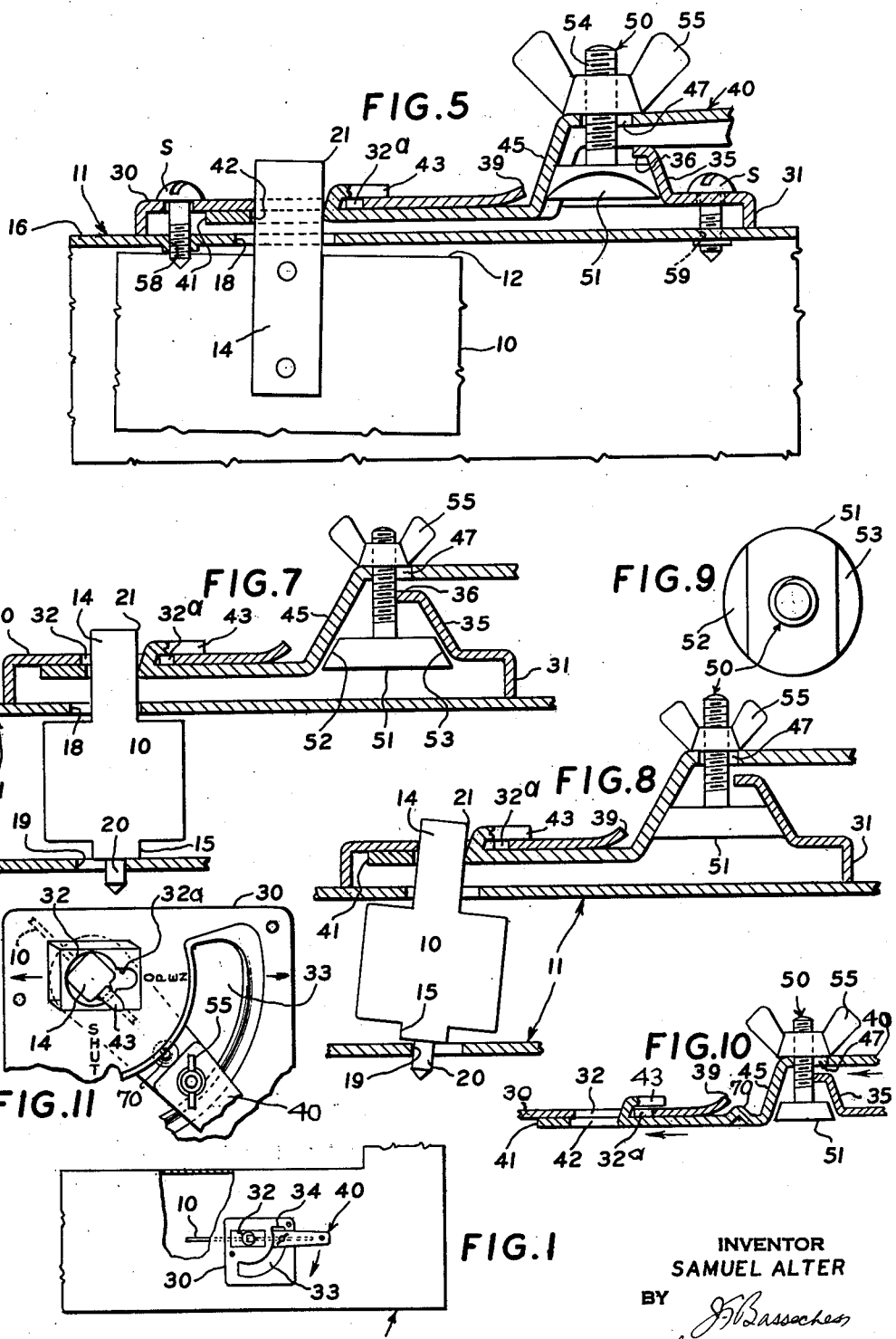
INVENTOR
SAMUEL ALTER
BY
J. V. Bassecches
his ATTORNEY

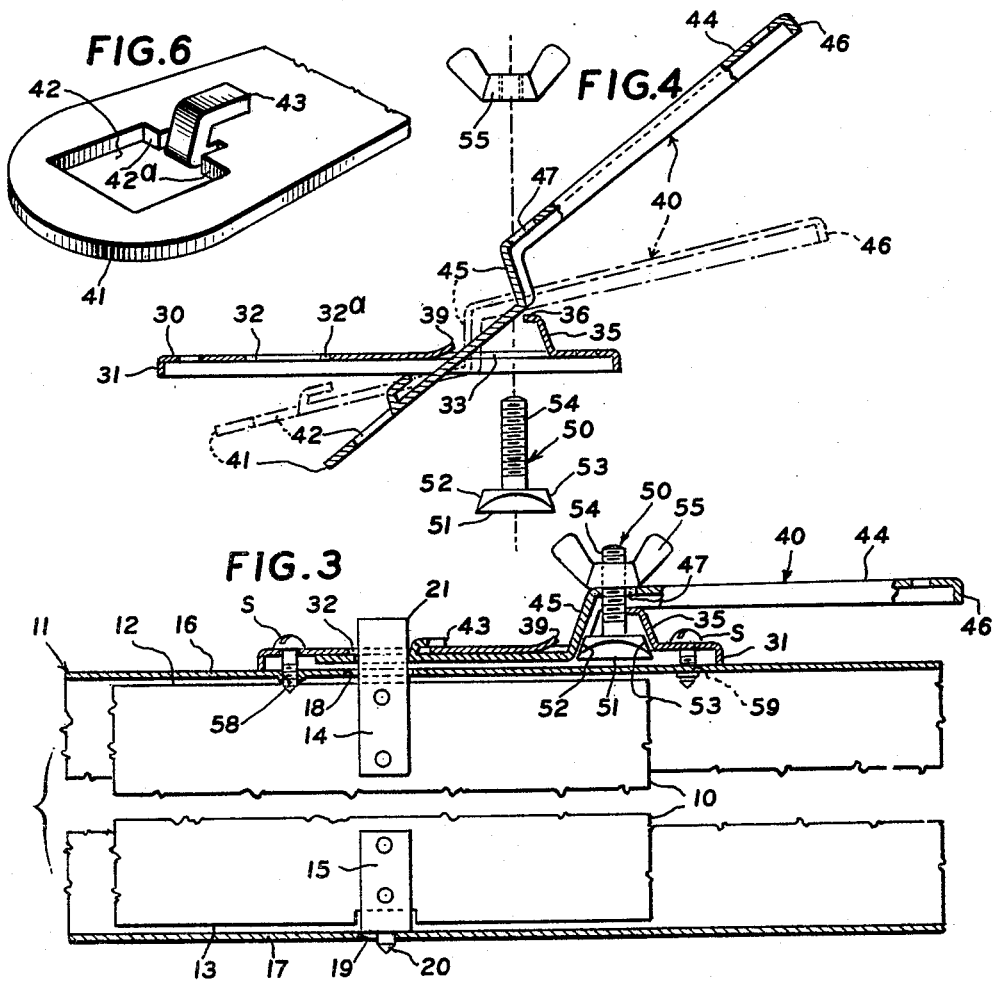
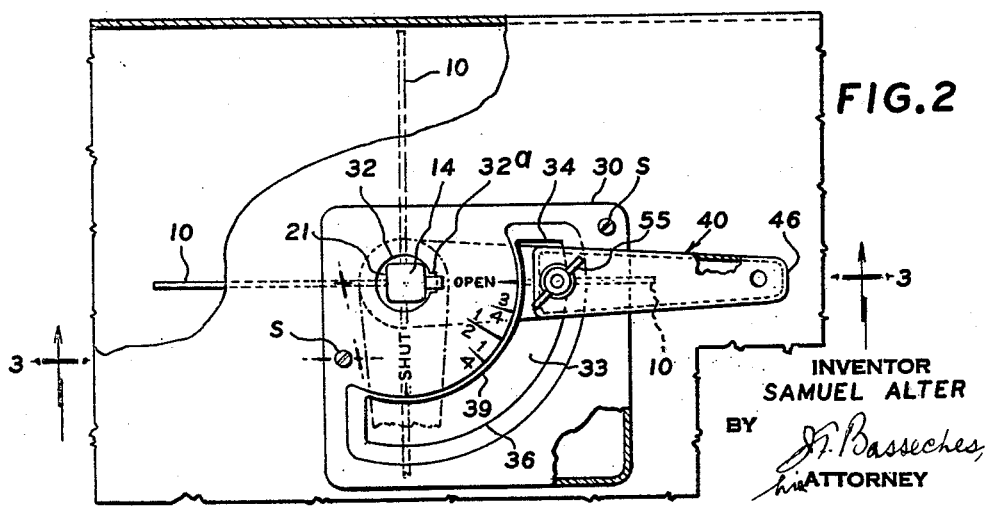

United States Patent Office 3,073,564
Patented Jan. 15, 1963

3,073,564
DAMPER REGULATOR
Samuel Alter, East Meadow, N.Y. (% Duro Dyne Corp., Rte. 110, Farmingdale, N.Y.)
Filed Feb. 18, 1960, Ser. No. 9,641
6 Claims. (Cl. 251—112)

This invention relates to a damper assembly for the control of air or the like. More particularly, this invention relates to a damper assembly for regulating the flow of air in the ducts of a system, such as a heating system or an air conditioning system. Still more particularly, this invention relates to a regulator and locking assembly for a damper or the like which eliminates the undesirable effects encountered in the use of damper assemblies heretofore known.

It is well known to provide at a plurality of points in ducted heating or air conditioning systems, regulating damper assemblies for controlling the rate of flow of air. Such known assemblies comprise generally a blade dimensioned to conform substantially to the cross section of the duct to be regulated, said blade being pivotally suspended between the side walls of the duct by a shaft secured to the blade, the ends of said shaft being journalled in bearing apertures formed for such purpose at approved points in the side walls of the duct. In such known damper assemblies, one of the ends of the shaft is provided with an irregularly shaped end portion which projects outwardly beyond the duct wall. A regulator handle is seated over the end portion of the shaft, for adjusting the angular orientation of the blade with respect to the duct. An indicator plate is provided adjacent the handle, to facilitate accurate adjustment. The handle may be locked in adjusted position by tightening a lock nut over a headed bolt which passes through the handle and through a quadrant slot formed in the indicator or dial plate. It will be readily recognized that the locking action in the known type of structure heretofore described is effected by force acting substantially parallel to the shaft axis, such force tending to press the handle against the indicator.

Damper assemblies of the type heretofore known tend, when air passes through the duct in which they are mounted, to chatter or rattle under the turbulent influence of the air, causing the transmission of vibrations and annoying sounds throughout the duct system. In the past, efforts to reduce the noise caused by damper assemblies have been directed primarily toward providing components which are accurately machined to be closer fitting, in the hope that the reduced clearances would result in a reduction of vibration and noises.

While these efforts resulted in a superior product, increased costs incident to accurate maching more than offset the slight reduction in vibration effected.

It is accordingly an object of this invention to provide a regulator assembly for a damper or the like which is substantially entirely free from a tendency to rattle or chatter under the turbulent influence of gaseous fluids impinged upon the damper blade.

A further object of this invention is to provide a regulator assembly having the aforesaid advantages which, nonetheless, may be economically produced.

Still a further object of this invention is to provide a locking regulator assembly having the aforesaid advantages and yet being comprised almost entirely of inexpensive metal stampings as opposed to assemblies heretofore known, many of which require cast or machined components.

Still a further object of this invention is to provide a damper assembly in which both ends of the damper blade shaft are secured against rattling.

The rattle-free operation of applicant's device is due to a novel locking feature wherein the damper blade shaft is locked in adjusted position by urging one end of the shaft laterally, or in a direction substantially normal to the axis of the shaft, forcing the shaft to tilt about a fulcrum point adjacent one end of the shaft until the other end of the shaft is impinged against a portion of the bearing aperture in which it is journalled. This lateral or sidewise locking action serves the double function of firmly securing the damper in the desired regulated position, and at the same time eliminating any tendency toward rattling of the shaft ends in the bearing apertures provided therefor.

Other features reside in the provision of a damper regulator assembly which is simple in construction and economical in assembly operations, while providing the feature of rattle-free performance.

To attain these objects and such further objects as may appear herein or be hereinafter pointed out, reference is made to the accompanying drawing, forming a part hereof, in which—

FIGURE 1 is an end elevation of duct to which has been applied a damper and regulator assembly in accordance with the invention;

FIGURE 2 is a magnified end elevation of the regulator assembly of FIGURE 1, with parts of the duct broken away;

FIGURE 3 is a further magnified fragmentary section taken on the lines 3—3 of FIGURE 2; with the regulator in unlocked position;

FIGURE 4 is a cross sectional view of the regulator, illustrating the position of the parts prior to assembly;

FIGURE 5 is a view similar to FIGURE 3 in the locked position of the regulator assembly;

FIGURE 6 is a magnified perspective view of the end portion of the regulator handle;

FIGURES 7 and 8 are diagrammatic views of the regulator and damper assembly, respectively, in the locked and unlocked positions;

FIGURE 9 is a plan view of the beveled locking bolt head;

FIGURE 10 is a fragmentary sectional view of another embodiment of my invention;

FIGURE 11 is a fragmentary plan view thereof.

The regulator assembly herein described is adapted to be used with a conventional damper structure, the latter comprising a sheet metal blade 10, pivotally suspended in duct 11. To the side marginal edges 12, 13, at a point on the center line of blade 10, there are fixedly secured axially aligned stub shafts 14, 15, respectively. While the illustrated damper employes separate shafts 14, 15, rivited at spaced points to blade 10, it should be understood that a single shaft having ends extending beyond the marginal edges of the blade may be used, the shafts 14, 15 functioning in effect as a single shaft.

The opposed side walls 16, 17 of the duct 11 are provided with aligned bearing apertures 18, 19, respectively, the latter aperture in the illustrated embodiment being of a size to accommodate, with moderate clearance, the trunnion 20 forming the end of shaft 15, and the former aperture being somewhat larger than the diagonal dimention of the squared end 21 of shaft 14.

It will be readily understood that when the blade 10 is secured in blocking position of duct 11 (see dot and dash lines, FIGURES 2), passage of air in the said duct is reduced to the minimum. Conversely, when the blade 10 is adjusted to the position shown in solid lines (FIGURE 2), a maximum air flow is permitted, with intermediate adjustments of blade 10 providing variations between the minimum and maximum flow.

The locking regulator assembly includes a dial plate 30 which may be of generally squared or oblong configuration in plan, the plate 30 including a peripheral inturned flange serving as a spacer portion 31. The plate 30 is provided with a relatively circular aperture 32, and in concentric spaced relation to said aperture, an arcuate quadrant slot 33, with a cut out extension or clearance lobe 32a, is provided, as will appear, to facilitate slidable assembly. The plate portions defining the far or larger radial outward wall 34 of the slot 33 (with respect to the aperture 32) are angularly oriented with respect to the plane of the plate 30, to form an inclined flange 35, terminating in a horizontal lip or rim 36.

A regulator handle 40 is slidably and rotatably secured to the plate 30 for adjustment of the damper blade 10. The handle 40 is provided with a flat end trunnion engaging portion 41, having a squared aperture 42 of a size slightly exceeding the cross-sectional dimensions of the end 21 of the shaft 14, to provide large clearance for canting of the trunnion portion of said shaft. A tongue 43 (see FIGURE 6) which may be formed of a portion of the metal removed from the end portion 41 in the forming of aperture 42, is bent back upon itself in spaced relation to the end part 41, to assume a generally J-shaped configuration, with sufficient spacing to receive the thickness of the metal of the dial plate 30.

The end part 41 is separated from the gripping portion 44 of handle 40 by an inclined shoulder portion 45. The edges of the gripping and shoulder portions 44, 45, respectively, are preferably turned as at 46, to rigidify the handle structure. An aperture 47 is formed in the handle 40 adjacent the shoulder portion 45, for purposes which will appear hereafter.

The handle 40 is assembled to the dial plate 30 by tilting the handle (solid lines, FIGURE 4) and inserting the end part 41 thereof through the slot 33, the wall 39 defining the inner arcuate edge of said slot being slightly turned to facilitate insertion and prevent binding in the inserted position of the handle. Aperture 32 is provided with an assembly cut out extension or lobe 32a, of a width corresponding generally with the width of the tongue 43, such lobe permitting the handle 40 to be swung through the dot and dash position illustrated in FIGURE 4, to the assembled position of FIGURE 3. The tongue 43, in the last phase of assembly, passes through the lobe or cut out extension 32a, and when the handle 40 is thereafter rotated, so that slidable contact is effected, the tongue will overlie a portion of the dial plate 30 surrounding the aperture 32, thereby slidably and rotatably linking the said handle 40 to the plate 30 with a relatively snug fit.

A bolt 50 is disposed in the space between the inner faces of shoulder 45 and flange 35. The opposed faces of the head 51 of the bolt 50 are ground or otherwise angularly formed, as at 52, 53, to provide a wedge-like configuration, preferably substantially conforming with the angle of shoulder 45 and flange 35, respectively. The threaded shank 54 of bolt 50 extends through the aperture 47 of the handle 40, the bolt 50 being thus maintained by the threaded engagement of the wing nut 55 over the said shank 54.

The regulator assembly is operatively connected to the damper mechanism by first seating the squared end 21 in complemental aperture 42 of the handle 40 in position so as to coordinate the regulator markings of the plate 30 with the true position of the blade 10. Sheet metal, self tapping screws S may then be passed through apertures provided therefor in the plate 30, which screws, when tightened into complemental pilot holes 58, 59 drilled in the duct wall 16, secure the plate 30 in spaced relation to the duct wall 16, with the margin portion 31 resting against such wall.

With the wing nut 55 in loosened position (see FIGURE 3), the handle 40 may be freely rotated within the limits of the quadrantal slot 33 to position the blade 10 in the desired angular orientation with respect to the duct 11. When thus adjusted, the nut 55 is tightened, drawing the wedge-like head 51 between the flange 35 and the shoulder 45. As the nut 55 is taken up, the wedge or block 51 imparts a lateral or radial component of force to the shoulder 45, shifting the handle 40 laterally or radially away from the area of impingement of the head 51 on the stationary flange 35.

The handle 40, in shifting in a plane or locus substantially parallel with the plane of dial plate 30, similarly shifts the end or shank 21 of the shaft 14, causing a tilting of the entire damper blade in a direction substantially normal to the axis of the shafts 14, 15. This movement may best be understood by reference to diagrammatic FIGURES 7 and 8, the latter illustrating the initial position of the parts during adjustment and before tightening, and the former the tightened or locked position.

From a consideration of FIGURES 7 and 8, it will be readily recognized that the parts 42a, defining the aperture 42, act to shift the shaft end 21 counter-clockwise as viewed in FIGURES 7 and 8, until a portion of the shaft adjacent said end bears against a part of the wall defining aperture 32. The entire blade 10 and the shafts carried thereby are, after such initial contact, rocked or canted in a clockwise direction about the contact point as a fulcrum, shifting the shaft 15 to the left, as shown in FIGURE 8 with the upper edge as the pivot.

Continued tightening of the nut 55 forces the shaft 15 further to the left until the trunnion portion 20 impinging against the side of the aperture 19 limits further movement, at which position the nut cannot be tightened further and the regulator is locked. It should be noted that both shaft ends are maintained under strain against a portion of the bearing apertures in which they are journalled, thereby eliminating any looseness or tendency to rattle at these points. Similarly, the handle is maintained tightly pressed against the shaft end 21, preventing looseness at this portion, despite the large tolerance of operation in working in the field or on the job without jigs or tools which may be used in a shop. The inherent springiness of the metal parts employed, when flexed in the manner taught, adds to the rigidity of the structure in the locked position.

While the embodiment illustrated and described utilizes a wall portion of the aperture 32 as the fulcrum about which the blade 10 and supporting shafts are pivoted in locking the same, it will be understood that a wall portion of the aperture 18 may be employed for this purpose, in which case the final pivoting of the blade and shaft would be in a direction counter to that previously described.

In FIGURES 10 and 11 there is shown an embodiment of the invention having a further feature for minimizing rattle and at the same time augmenting the locking of the regulator handle with respect to the dial plate.

The reference numerals employed in FIGURES 10 and 11 are identical with those employed in the description of the other figures, the dial plate having imprinted thereon indications of damper to duct position.

The handle 40 of this embodiment is provided with a raised camming detent or dimple 70, in spaced relation to inclined shoulder 45. The dimple 70 is arranged, in the assembled relationship of the handle 40 to dial plate 30, to lie in proximate relation to the inclined or upturned lip 39 of the slot 33.

The embodiment of FIGURES 10 and 11 operates in all respects like the previously described embodiment but has the additional advantage, upon the lateral shifting movement of the handle 40 with respect to the dial plate 30, of directing and forcing the dimple or detent 70 against the underside of lip or wall 39, thereby augmenting the anchoring of the regulator assembly in locked position thereof. Likewise, the wedging effect of the dimple 70 on the dial plate acts to prevent any rattling of the end part 41 of handle 40 against the plate 30, which might have resulted if there were any looseness in the fit of those parts and only a limited contacting engagement of the handle 40 and plate 30.

Having thus described my invention and illustrated its use, what is claimed as new and is desired to be secured by Letters Patent is:

1. In a damper assembly for a duct including a damper blade secured to a shaft pivotally mounted in a duct, with at least one end of said shaft extending outwardly through a wall of said duct, fulcrum means on said duct adjacent said shaft, a locking regulator assembly comprising a handle keyed to said extending end of said shaft and engaging said shaft at a point longitudinally displaced with respect to the point of engagement of said shaft and fulcrum means, an arcuate member carried by said wall and concentrically positioned with respect to the axis of said shaft, and locking means interposed between said member and said handle adapted, upon actuation, to shift said handle radially with respect to said arcaute member whereby said shaft will be tilted about said fulcrum means as a pivot.

2. In a damper assembly, a duct or the like including a damper blade secured to a shaft pivotally mounted in said duct, with at least one end of said shaft extending outwardly through a wall of said duct, a locking regulator assembly comprising fulcrum means positioned adjacent said shaft, an arcuate flange member secured to said wall, said flange member being positioned concentrically with respect to the axis of said shaft and having a portion inclined with respect to the plane of said wall, a regulator handle keyed to said extending end of said shaft engaging said shaft at a point longitudinally displaced from the point of engagement of said shaft and said fulcrum means, a shoulder portion on said handle in spaced relation to and inclined in the direction of said inclined portion of said flange member, a wedge member disposed between said shoulder and said inclined portion of said flange, and locking means associated with said wedge means arranged, upon actuation, to shift said wedge means in a direction normal to the plane of said wall, thereby shifting said handle toward said fulcrum means.

3. A locking regulator assembly for a damper blade comprising a dial plate, a regulator handle member having an end portion rotatably secured to said dial plate, a shaft adapted to be secured to the damper blade, key means on said end portion engaged to the shaft of said blade, an aperture in said dial plate through which an end of said shaft may project, fulcrum means on said dial plate, an arcuate flange on said dial plate, said flange being inclined with respect to the plane of said dial plate, a shoulder on said handle member, said shoulder being inclined toward said flange, a lockingwedge member disposed between said flange and said shoulder and threaded means carried by said handle member and operatively associated with said wedge member adapted to shift the latter substantially normal to the plane of said plate whereby said handle portion shifts said shaft laterally against said fulcrum means to tilt said shaft about said fulcrum means.

4. In a damper assembly including a duct having axially aligned bearings in opposed walls, a damper blade, and a shaft secured to said blade and having end portions projecting beyond said blade and pivotally supported on said bearings, means for securing said blade in fixed relation to said duct comprising fulcrum means adjacent a projecting portion of said shaft and locking means shiftable against said projecting portion of said shaft to tilt said shaft about said fulcrum means as a pivot.

5. A damper assembly comprising a duct having opposed bearing apertures formed therein, a damper blade, a shaft secured to said blade, the ends of said shaft being journalled in said apertures, furcrum means on said duct adjacent one end of said shaft, a handle engaging said one end of said shaft at a point along said shaft longitudinally displaced from said fulcrum means, and locking means actuable to shift said handle normal to the axis of said shaft and toward said fulcrum means.

6. A damper regulator assembly for adjustably maintaining a damper blade in a duct, having opposed bearing apertures, comprising a shaft member, a handle keyed to an end of said shaft member, fulcrum means adjacent said shaft member at a point longitudinally displaced along said shaft from the point of engagement of said handle and said shaft and threaded means adapted to shift said handle relative to said fulcrum, whereby said shaft is engaged with and tilted about said fulcrum as a pivot.

References Cited in the file of this patent
UNITED STATES PATENTS

| | | |
|---|---|---|
| 609,135 | Benson | Aug. 16, 1898 |
| 1,885,548 | Rosenberg | Nov. 1, 1932 |
| 2,114,115 | Rosenberg | Apr. 12, 1938 |
| 2,129,505 | Rosenberg | Sept. 6, 1938 |